US008049166B2

(12) United States Patent
Shiokawa et al.

(10) Patent No.: US 8,049,166 B2
(45) Date of Patent: Nov. 1, 2011

(54) MASS SPECTROMETER SYSTEM AND MASS SPECTROMETRY METHOD

(75) Inventors: Yoshiro Shiokawa, Hachioji (JP); Megumi Nakamura, Tama (JP); Harumi Maruyama, Inagi (JP)

(73) Assignee: Canon Anelva Corporation, Kawasaki-shi (JP)

( * ) Notice: Subject to any disclaimer, the term of this patent is extended or adjusted under 35 U.S.C. 154(b) by 148 days.

(21) Appl. No.: 12/645,610

(22) Filed: Dec. 23, 2009

(65) Prior Publication Data

US 2010/0163723 A1 Jul. 1, 2010

(30) Foreign Application Priority Data

Dec. 26, 2008 (JP) ................................. 2008-335095
Dec. 16, 2009 (JP) ................................. 2009-285722

(51) Int. Cl.
*H01J 49/26* (2006.01)
*B01D 59/44* (2006.01)

(52) U.S. Cl. ............ 250/282; 250/281; 250/288; 423/1; 423/33; 73/23.36; 73/23.37

(58) Field of Classification Search .................. 250/281, 250/282, 288, 289; 423/1, 6, 33, 72, 94, 423/116, 462–464, 489, 491, 659; 73/23.36, 73/23.37
See application file for complete search history.

(56) References Cited

U.S. PATENT DOCUMENTS

| | | | | |
|---|---|---|---|---|
| 6,507,020 | B2 | 1/2003 | Shiokawa et al. | 250/288 |
| 6,800,848 | B2 | 10/2004 | Shiokawa et al. | 250/282 |
| 7,005,634 | B2 | 2/2006 | Shiokawa et al. | 250/288 |
| 7,952,069 | B2 * | 5/2011 | Shiokawa et al. | 250/282 |
| 2009/0266979 | A1 * | 10/2009 | Nakamura et al. | 250/281 |
| 2009/0266981 | A1 | 10/2009 | Shiokawa et al. | 250/282 |
| 2009/0272894 | A1 * | 11/2009 | Shiokawa et al. | 250/282 |
| 2010/0163722 | A1 * | 7/2010 | Shiokawa et al. | 250/282 |

FOREIGN PATENT DOCUMENTS

| | | |
|---|---|---|
| JP | 6-11485 | 1/1994 |
| JP | 2001-174437 A | 6/2001 |

(Continued)

OTHER PUBLICATIONS

Hodges, R.V. et al., "Application of Alkali Ions in Chemical Ionization Mass Spectrometry," Analytical Chemistry, 48, 6, (1976), pp. 825-829.

(Continued)

*Primary Examiner* — Bernard E Souw
(74) *Attorney, Agent, or Firm* — Fitzpatrick, Cella, Harper & Scinto

(57) ABSTRACT

A mass spectrometer system comprises a chamber having an ion emitting unit to emit metal ions in the chamber with a communicating hole; a neutral molecule introduction unit; another gas introduction unit; a controller controlling a temperature of a region where metal ions attach to the neutral molecules; and a mass analyzer for the neutral molecules with the metal ions, wherein plotting an attachment energy of the metal ions attached to the neutral molecules in the chamber along an abscissa and the temperature of the region where the metal ions attach to the neutral molecules along an ordinate, the controller adjusts the temperature of the region so as to fall within a range obtained by excluding a range corresponding to the temperature of the region from 150 to 200° C. from a range surrounded by the temperatures of the region [° C.]=150×attachment energy [eV], 100×attachment energy [eV]−50, and 20° C., and attachment energies [eV]=2.1 and 0.5.

8 Claims, 9 Drawing Sheets

FOREIGN PATENT DOCUMENTS

| | | | |
|---|---|---|---|
| JP | 2001-351567 | A | 12/2001 |
| JP | 2001-351568 | A | 12/2001 |
| JP | 2002-124208 | A | 4/2002 |
| JP | 2002-170518 | A | 6/2002 |
| JP | 2002-298776 | A | 10/2002 |

OTHER PUBLICATIONS

Bombick, D. et al., "Potassium Ion Chemical ionization and Other Uses of an Alkali Thermionic Emitter in Mass Spectrometry," Analytical Chemistry, 56, (1984), pp. 396-402.

Fujii, T. et al., "Chemical Ionization Mass Spectrometry with Lithium Ion Attachment to the Molecule," Analytical Chemistry, 61, (1989), pp. 1026-1029.

Fujii, T. et al., "A Novel Method for Detection of Radical Species in the Gas Phase: Usage of $Li^+$ Ion Attachment to Chemical Species," Chemical Physics Letters, 191, 1.2, (1992), pp. 162-168.

Faye, T. et al., "Sodium Ion Attachment Reactions in an Ion Trap Mass Spectrometer," Rapid Communications in Mass Spectrometry, 14, (2000), pp. 1066-1073.

Shiokawa, Y. et al., "Development of Ion Attachment Mass Spectrometry and its Applications," The Japan Society for Analytical Chemistry, 53, 6, (2004), pp. 475-489 (with English abstract).

Shiokawa, Y. et al., "Development of Ion Attachment Mass Spectrometry and its Applications," The Journal of the Vacuum Society of Japan, 50, (2007), pp. 234-240.

Kato, S. et al., "Measurement of Volatile Organic Carbons by Proton Transfer Reaction Mass Spectrometry," The Journal of the Vacuum Society of Japan, 47, 8, (2003), pp. 600-605.

* cited by examiner

MASS SPECTROMETER SYSTEM AND MASS SPECTROMETRY METHOD

BACKGROUND OF THE INVENTION

1. Field of the Invention

The present invention relates to a mass spectrometer system and mass spectrometry method and, more particularly, to an ion attachment mass spectrometry technique of analyzing the mass of neutral molecules having metal ions attached to them.

2. Description of the Related Art

IAMS (Ion Attachment Mass Spectrometry) is mass spectrometry which ionizes neutral gas phase molecules (gas) without dissociating (fragmenting) them (molecular ions) and analyzes the mass of the molecular ions. This method is effective for analysis of an organic material which readily causes decomposition (dissociation, fission, or fragmentation) upon ionization.

Non-patent references 1 to 5 describe ion attachment mass spectrometer systems. Non-patent references 6 and 7 describe the influences of temperatures on ion attachment mass spectrometer systems.

FIG. 7 is a view showing an example of the arrangement of an ion attachment mass spectrometer system (to be abbreviated as a mass spectrometer system hereinafter) for a solid/liquid sample. Referring to FIG. 7, an ion generation source 100 and a sample vaporization chamber 140 are arranged in a first cell 180. A mass analyzer 160 is arranged in a second cell 190. A vacuum pump 170 reduces the pressure in the first cell 180 and the second cell 190. Hence, all the ion generation source 100, sample vaporization chamber 140, and mass analyzer 160 exist in a low-pressure atmosphere having a pressure lower than the atmospheric pressure.

The ion generation source 100 includes an emitter 120 serving as an ion-emitting unit in a chamber 110. The emitter 120 is a sintered body made of an alumina silicade (an eutectic material of aluminum oxide and silicon oxide) containing an oxide, carbonate, or salt of an alkali metal (e.g., Li) etc. When heated to about 600° C. to 800° C. in a low pressure atmosphere, the emitter 120 generates, from its surface, positively charged alkali metal ions (metal ions) such as $Li^+$. A solid/liquid sample 150 is heated in the sample vaporization chamber 140 serving as a neutral molecule introduction means so as to turn into neutral gas phase molecules (gas), that is, vaporized neutral molecules. The neutral gas phase molecules then move to the ion generation source 100 by, for example, diffusion, gas flow, or buoyancy of themselves and enter the chamber 110.

Next, the ion generation source 100 ionizes the neutral gas phase molecules to generate molecular ions. The metal ions attach to the charge localized portions of the neutral gas phase molecules. The molecules with the metal ions attached (ion-attached molecules) form ions having positive charges as a whole.

However, after metal ion attachment to the neutral gas phase molecules, if the ion-attached molecules are left as they are (keep holding the extra energy), the extra energy dissociates the bond between the metal ions and the neutral gas phase molecules. When the metal ions are separated from the neutral gas phase molecules, the ion-attached molecules return to the original neutral gas phase molecules. To prevent this, a gas such as $N_2$ is introduced into the ion generation source 100 at a pressure of about 50 to 100 Pa (at a flow rate of 5 to 10 sccm) to cause the ion-attached molecules to often collide with the gas molecules. At this time, the extra energy held by the ion-attached molecules moves to the other gas molecules, and the ion-attached molecules stabilize. The other gas is called a three-body gas. A three-body gas cylinder 200 serving as a three-body gas introduction means is connected to the ion generation source 100 via a pipe to introduce the gas into the chamber 110.

The effect of the three-body gas will be explained here with reference to FIG. 9. FIG. 9 shows the potential energy near the ion-attached molecules. Reference numeral 801 indicates a potential near the molecules; and 802, an ion such as $Li^+$ attached to the molecules. Since the potential 801 has a potential well as shown in FIG. 9, the ion 802 oscillates around a lowest point 803 of the potential. However, when a three-body gas such as nitrogen collides with the ion-attached molecules, the oscillation energy moves to the three-body gas so that the molecules can stably continue existing in the ion-attached state. As a result, the molecules are ionized without being fragmented. That is, molecular ions in the original molecular state are formed.

An ion attachment region 210 where the metal ions attach to the neutral gas phase molecules can be limited to a region where the metal ions emitted from the emitter 120, the neutral gas phase molecules corresponding to the sample component, and the three-body gas introduced from the outside exist simultaneously.

Finally, the ion-attached molecules are transported from the ion generation source 100 (communicating hole 110*a* of the chamber 110) to the mass analyzer 160 upon receiving the force of an electric field. The mass analyzer 160 fractionates and measures the mass of the ions. To generate the electric field, the potential of the entire ion generation source 100 is set to be positive (e.g., 10 V), and the potential of the entire mass analyzer 160 is set to 0 V most commonly, although not illustrated.

The ion attachment mass spectrometry capable of ionizing original molecules without decomposing them is advantageous because it enables highly accurate, quick, and simple measurement, as will be explained below.

In techniques other than the ion attachment mass spectrometry, various kinds of decomposition peaks appear in a mass spectrum. It is therefore necessary to separate components using a gas chromatograph (GC) or a liquid chromatograph (LC) before mass analysis. To normally separate the components of many samples by GC/LC, a complex and cumbersome preprocess is required for each sample. Normally, the component separation takes several ten min, and the preprocess takes several to several tens of hours.

On the other hand, a mass spectrum measured by the ion attachment mass spectrometry has no decomposition peak but only the original molecular peak. In short, a sample containing n kinds of components exhibits n peaks, and the components can be qualitatively and quantitatively measured based on their mass numbers. It is therefore possible to directly measure even a mixed sample containing a plurality of components without component separation. The ion attachment mass spectrometry requires neither preprocess nor component separation necessary in other techniques. Hence, measurement can end in only several minutes, and highly accurate, quick, and simple measurement can be done.

FIG. 8 illustrates the arrangement of another conventional ion attachment mass spectrometer system for a gas sample. The same reference numerals as in FIG. 7 denote the same parts in FIG. 8. Since the sample is gaseous, no sample vaporization chamber 140 exists. The sample is directly introduced from a sample gas cylinder 220 to the ion generation source 100. The remaining structures, operations, and advantages in measurement are the same as in FIG. 7.

Prior-art references are Japanese Patent Laid-Open Nos. 6-11485, 2001-174437, 2001-351567, 2001-351568, 2002-124208, 2002-170518, and 2002-298776.

Non-patent reference 1 is "Hodge (Analytical Chemistry vol. 48, No. 6, p. 825 (1976))". Non-patent reference 2 is "Bombick (Analytical Chemistry vol. 56, No. 3, p. 396 (1984))". Non-patent reference 3 is "Fujii (Analytical Chemistry vol. 61, No. 9, p. 1026 (1989))". Non-patent reference 4 is "Chemical Physics Letters vol. 191, No. 1.2, p. 162 (1992)". Non-patent reference 5 is "Rapid Communication in Mass Spectrometry vol. 14, p. 1066 (2000)". Non-patent reference 6 is "Analytical Chemistry, vol. 53, p. 475 (2004)". Non-patent reference 7 is "Vacuum, vol. 50, p. 234 (2007)".

In the ionization method using the above-described ion attachment method, if the ion generation source is warmed to general 150° C. to 200° C. to reduce the influence of condensation/adsorption at the ion generation source, the ionization efficiency (sensitivity) greatly lowers in some substances on one hand, and the influence of condensation/adsorption remains in other substances on the other hand.

SUMMARY OF THE INVENTION

The present invention has been made in consideration of the above-described problems, and has as its object to implement a technique of generally solving both problems of a decrease in the ionization efficiency (sensitivity) and condensation/adsorption.

In order to solve the aforementioned problems, the present invention provides a mass spectrometer system comprising: a chamber having an ion emitting unit to emit metal ions in to chamber with a communicating hole; a molecule introduction unit which introduces neutral molecules into the chamber; a gas introduction unit which introduces another gas into the chamber; a control unit which controls a temperature of a region where the metal ions attach to the neutral molecules in the chamber; and a mass analyzer which analyzes a mass of the neutral molecules having the metal ions attached and emitted from the communicating hole, wherein plotting an attachment energy of the metal ions attached to the neutral molecules in the chamber along an abscissa and the temperature of the region where the metal ions attach to the neutral molecules along an ordinate, the control unit adjusts the temperature of the region so as to make the temperature fall within a range obtained by excluding a range corresponding to the temperature of the region from 150° C. to 200° C. (both inclusive) from a range surrounded by the temperatures of the region [° C.]=150×attachment energy [eV], 100×attachment energy [eV]−50, and 20° C., and attachment energies [eV]=2.1 and 0.5.

The present invention also provides a mass spectrometry method in mass spectrometer system that comprises a chamber having an ion emitting unit to emit metal ions in the chamber with a communicating hole; a molecule introduction unit which introduces neutral molecules into the chamber; a gas introduction unit which introduces another gas into the chamber; and a mass analyzer which analyzes a mass of the neutral molecules having the metal ions attached and emitted from the communicating hole, the method comprising the step of controlling a temperature of a region where the metal ions attach to the neutral molecules in the chamber, wherein in the controlling step, plotting an attachment energy of the metal ions attached to the neutral molecules in the chamber along an abscissa and the temperature of the region where the metal ions attach to the neutral molecules along an ordinate, the temperature of the region is adjusted so as to make the temperature fall within a range obtained by excluding a range corresponding to the temperature of the region from 150° C. to 200° C. (both inclusive) from a range surrounded by the temperatures of the region [° C.]=150×attachment energy [eV], 100×attachment energy [eV]−50, and 20° C., and attachment energies [eV]=2.1 and 0.5.

According to the present invention, it is possible to solve both problems of a decrease in the ionization efficiency (sensitivity) and condensation/adsorption at the ion generation source. This makes it possible to apply quick and simple measurement by the ion attachment method to many substances in a wider range.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

How the present invention has been made will be explained before a description of embodiments of the present invention.

<Temperature of Ion Generation Source in General Mass Spectrometer System>

In general, the ion generation source (chamber) of a mass spectrometer system for measuring a solid/liquid sample is always warmed. It is common to many ionization methods including not only typical electron bombardment ionization but also electron spray and atmospheric pressure ionization, and aims at preventing contamination of the chamber, reducing the memory effect, and ensuring measurement sensitivity even for a high-boiling temperature component. The magnitude of condensation or adsorption strongly depends on the boiling temperature point characteristic of a component itself. For this reason, the chamber is heated to a high temperature to prevent condensation/adsorption of a high-boiling substance in it. Contamination occurs due to a high-boiling temperature component of components. Memory occurs due to re-desorption after condensation/adsorption. Both problems arise based on the same mechanism.

Figure 7:
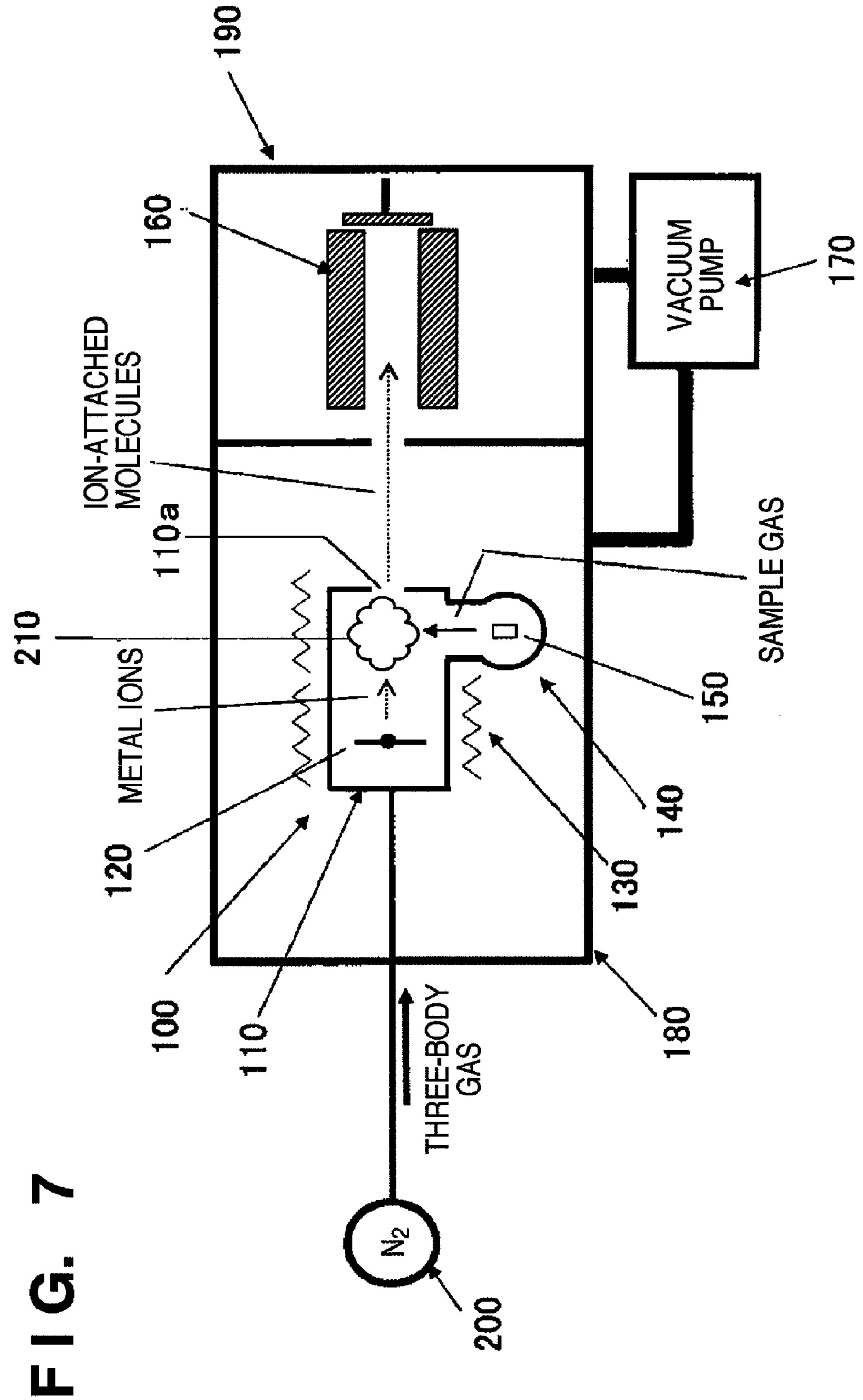
FIG. 7 is a view showing the arrangement of a mass spectrometer system for a solid/liquid sample according to a prior art.
Figure 8:
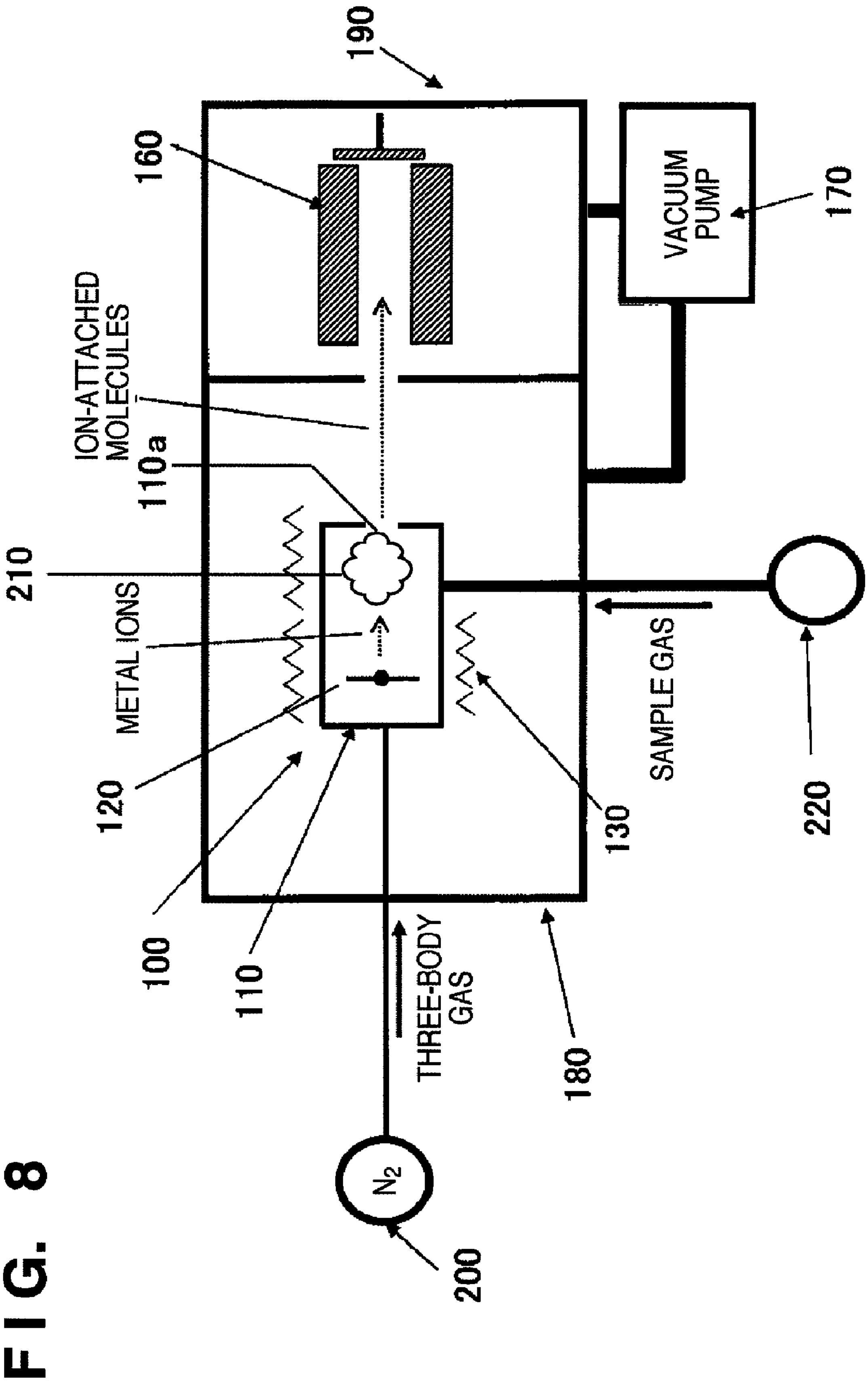
FIG. 8 is a view showing the arrangement of a mass spectrometer system for a gas sample according to a prior art.
Figure 9:
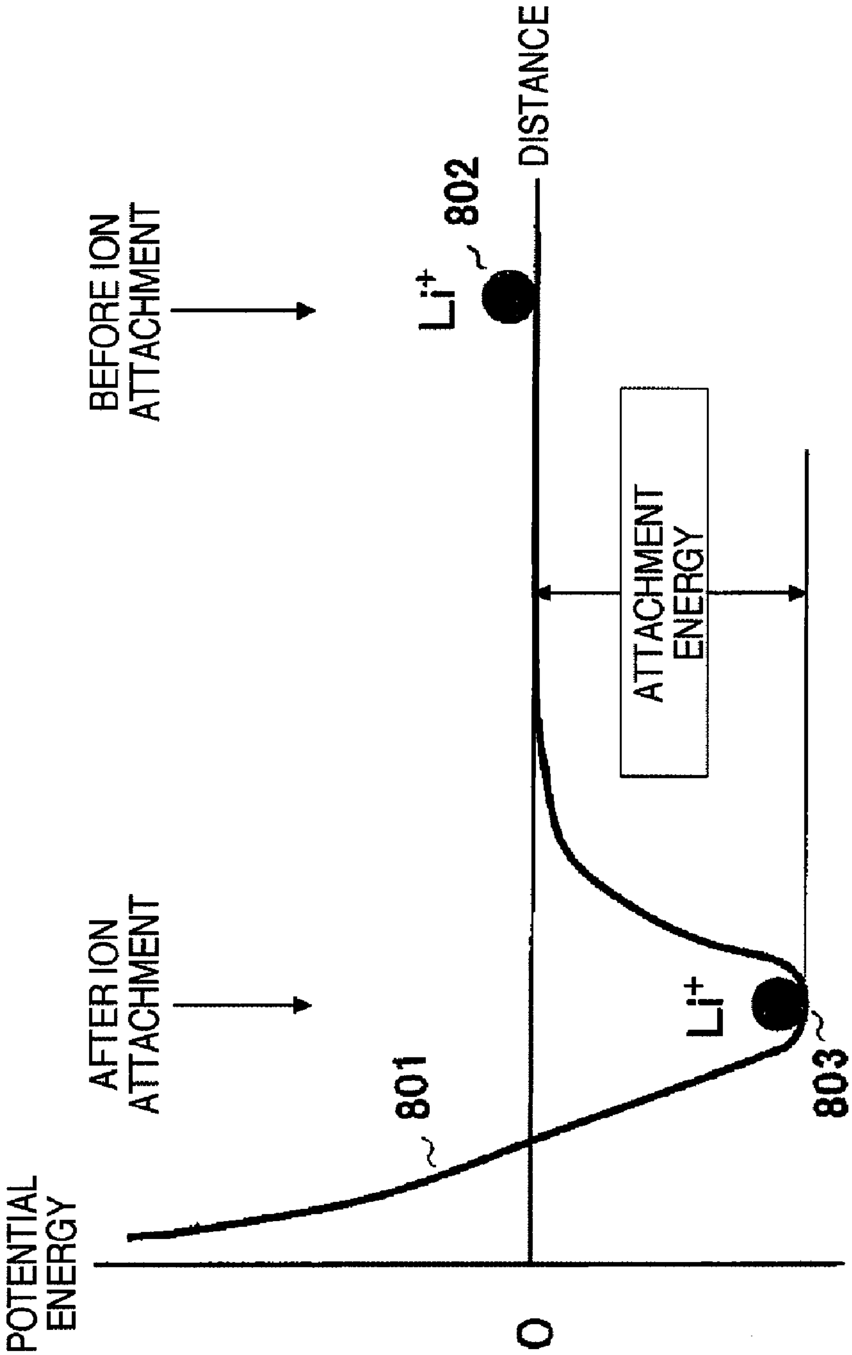
FIG. 9 is a graph for explaining the effect of a three-body gas.

Important is that in the ionization methods such as electron bombardment ionization, electron spray, and atmospheric pressure ionization, the ionization efficiency does not depend on the chamber temperature in principle. Considering all conditions such as condensation/adsorption and reasons concerning design/manufacturing, the chamber temperature is set at 150° C. to 200° C. by common sense in a mass spectrometer system. The chamber temperature rarely largely changes depending on the sample type. For the above-described reasons, the chambers shown in FIGS. 7 and 8 of the ion attachment method are also set at the practical temperature of 150° C. to 200° C.

<Temperature Dependence of Ionization Efficiency (Sensitivity)>

Figure 6:
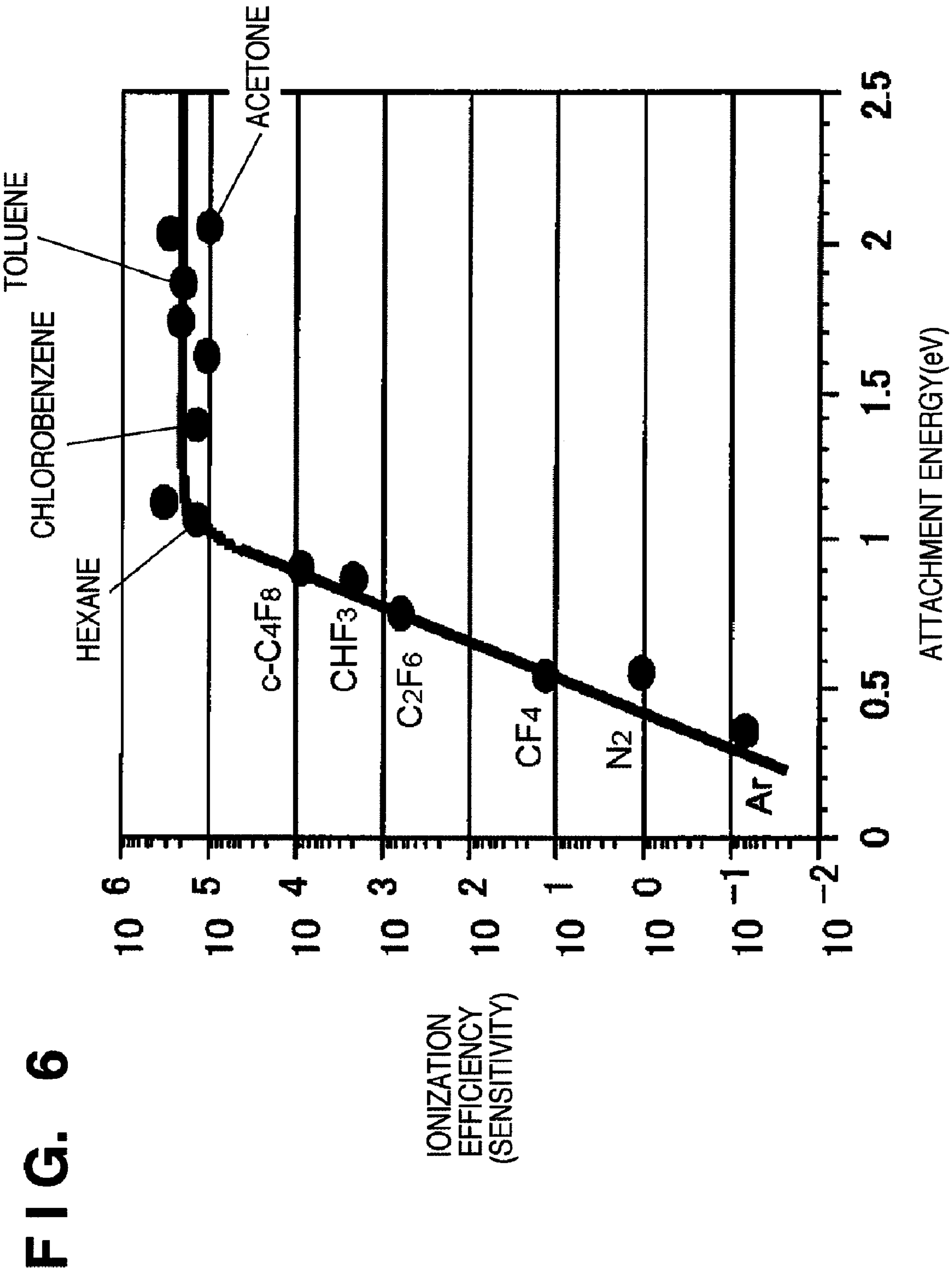
FIG. 6 is a graph showing the relationship between the attachment energy and the ionization efficiency (sensitivity) according to patent references 6 and 7.

The attachment energy decides the ease of attachment of metal ions to neutral gas phase molecules. The attachment energy largely depends on the distribution of the charges in the neutral gas phase molecules. The attachment energy is obtained by experiments or theoretical calculations. For example, the attachment energy of Li is 0.5 eV for $N_2$, 0.8 eV for $C_2F_6$, 1.0 eV for hexane, 1.4 eV for chlorobenzene, 1.8 eV for toluene, and 2.0 eV for acetone. However, the ionization efficiency, that is, sensitivity that is important for analysis is not directly proportional to the attachment energy. Non-patent references 6 and 7 by the present inventor describe the relationship between the attachment energy and the sensitivity in detail. FIG. 6 shows the final result. The ordinate represents the logarithms. The ionization efficiency (sensitivity) largely lowers at an attachment energy of 1 eV or less but is almost constant at 1 eV or more.

The mechanism will briefly be described. Even ion-attached molecules which have stabilized upon colliding with a three-body gas sometimes return to the original neutral gas phase molecules because of dissociation of metal ions. This phenomenon readily occurs as the attachment energy becomes weaker. At 1 eV or less, this process is rate-determining and dominant, resulting in the large decrease in the ionization efficiency (sensitivity). At 1 eV or more, however, the frequency of another process, that is, collision between metal ions 104 and neutral gas phase molecules 112 is rate-determining and dominant. However, since the collision frequency is irrelevant to the attachment energy, the ionization efficiency (sensitivity) is almost constant. Note that the result shown in FIG. 6 is the result of a gas sample, and, the chamber temperature is room temperature. $Li^+$ is used as the metal ions.

Many samples were measured by setting the chamber at the conventional practical temperature of 150° C. to 200° C. to measure solid/liquid samples. It was found that the ionization efficiencies (sensitivities) of some substances were lower than the value shown in FIG. 6. Roughly speaking, a substance having an attachment energy of about 2 eV exhibited almost the same ionization efficiency (sensitivity) as in FIG. 6 up to a chamber temperature of about 200° C. but a lower ionization efficiency at 200° C. or more. A substance having an attachment energy of about 1 eV exhibited almost the same ionization efficiency (sensitivity) as in FIG. 6 up to about 100° C. but a lower ionization efficiency at 100° C. or more. A substance having an attachment energy of about 0.5 eV exhibited a lower ionization efficiency at about 50° C. or more. These phenomena are supposed to take place because the energy to dissociate metal ions from ion-attached molecules is produced by the thermal energy of the temperature of the ion-attached molecules themselves, and the metal ions are easily dissociated at a high temperature. The degree of the decrease in the ionization efficiency (sensitivity) is determined, based on both theories and experimental results, to be almost inversely proportional to the attachment energy. More specifically, in a substance having a low attachment energy, the temperature dependence of the ionization efficiency (sensitivity) is strong (the decrease is conspicuous). However, in a substance having a high attachment energy, the temperature dependence is weak (the decrease is small).

<Temperature of Ion Generation Source in Ion Attachment Method>

Generally, the chamber of an ion generation source is warmed to, for example, ensure the measurement sensitivity of a high-boiling temperature component. Fundamentally, this also applies to the ion attachment method. However, in the ion attachment method, the ion generation source has a complex structure, resulting in larger influence. For this reason, the general temperature of 150° C. to 200° C. is insufficient for a substance having a high boiling point. However, in a substance having a low attachment energy, the ionization efficiency (sensitivity) lowers at a higher temperature, as described above. That is, an optimum ion generation source temperature exists for each substance. It is therefore important to select the temperature of the ion generation source.

The relationship of the boiling point temperature with the attachment energy is known even for the other important element Based on both theories and experimental results, the attachment energy and the boiling point of a substance to which ions attach were determined to hold a moderate proportional relationship as a whole with a few exceptions. More specifically, the boiling point temperature of a substance having a low attachment energy is generally low (condensation/adsorption is small). However, the boiling point temperature of a substance having a high attachment energy is generally high (condensation/adsorption is conspicuous). The relationship between the attachment energy and the boiling point temperature represents that ions attached to a substance having a high boiling point are hard to dissociate.

The present invention has been made based on the fact that the decrease in the ionization efficiency (sensitivity) is almost inversely proportional to the attachment energy but the boiling point temperature is moderately proportional (to the attachment energy). Note that this fact is a finding of only the present inventor and is not a known finding.

A technique related to the present invention is proton transfer reaction (to be abbreviated as PTR hereinafter). The PTR transfers hydrogen ions to target measurement molecules using the difference of proton affinity. In the PTR, since ions to attach target measurement molecules are not metal ions but hydrogen ions, characteristics concerning the ionization efficiency (sensitivity) associated with the present invention are different. The PTR is described in, for example, Shungo Kato et al., "Measurement of Volatile Organic Carbons by Proton Transfer Reaction Mass Spectrometry" Journal of the Vacuum Society of Japan, Vol. 47, No. 8, pp. 600-605. Equation (3) in this reference includes no parameter of temperature. The relationship between the ionization efficiency and the temperature is not disclosed. Hence, in the PTR, the ambient temperature such as the temperature of the ion attachment region does not influence the sensitivity.

<Control of Temperature of Ion Attachment Region>

Control of the temperature of the ion attachment region according to this embodiment will be described next with reference to FIGS. 1 and 2.

Figure 1:
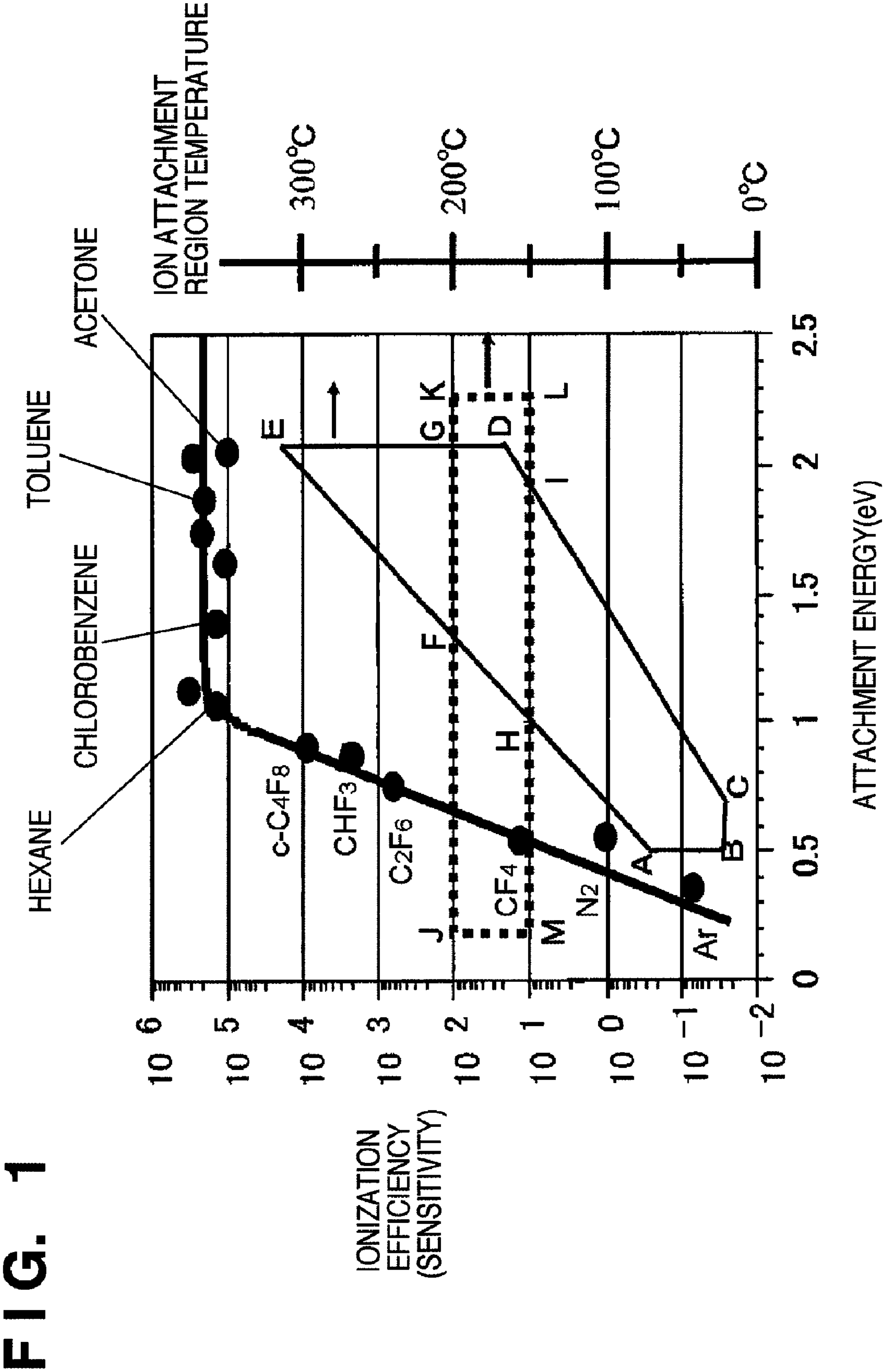
FIG. 1 is a graph showing the temperature range of an ion attachment region according to the present invention.

In this embodiment, to solve both problems of a decrease in the ionization efficiency (sensitivity) and condensation/adsorption, the temperature of an ion attachment region 210 of an ion generation source 100 is set within the range ABCDE shown in FIG. 1 in accordance with the magnitude of the attachment energy. More specifically, a control unit 300 controls a heater 130 and a flow rate control unit 310, thereby adjusting the temperature of the ion attachment region 210. The temperature of the ion attachment region is adjusted such that it falls within the range ABCDE surrounded by the ion attachment region temperature [° C.]=150×attachment energy [eV] (line AE), temperature [° C.]=100×attachment energy [eV]−50 (line CD), temperature=20° C. (line BC), attachment energy [eV]=2.1 (line DE), and attachment energy=0.5 (line AB) in FIG. 1. That is, the range ABODE corresponds to a temperature [° C.] equal to or lower than a value defined by 150×attachment energy [eV] and equal to or higher than a value defined by 100×attachment energy [eV]−50, an attachment energy of 0.5 to 2.1 eV and equal to or higher than 20° C. In FIG. 1, the point A corresponds to an attachment energy of 0.5 eV and a temperature of 75° C. The point B corresponds to an attachment energy of 0.5 eV and a temperature of 20° C. The point C corresponds to an attachment energy of 0.7 eV and a temperature of 20° C. The point D corresponds to an attachment energy of 2.1 eV and a temperature of 160° C. The point E corresponds to an attachment energy of 2.1 eV and a temperature of 315° C. The point F corresponds to an attachment energy of about 1.3 eV and a temperature of 200° C. The point G corresponds to an attachment energy of 2.1 eV and a temperature of 200° C. The point I corresponds to an attachment energy of 2.0 eV and a temperature of 150° C. The point H corresponds to an attachment energy of 1.0 eV and a temperature of 150° C.

Note that a range JKLM surrounded by dotted lines in FIG. 1 is the conventionally used temperature range considering the influence of condensation/adsorption. The point J corresponds to an attachment energy of 0.2 eV and a temperature of 200° C. The point K corresponds to an attachment energy of 2.25 eV and a temperature of 200° C. The point L corresponds to an attachment energy of 2.25 eV and a temperature of 150° C. The point M corresponds to an attachment energy of 0.2 eV and a temperature of 150° C. Hence, in the present invention, the temperature of the ion attachment region of the ion generation source is set within at least one of the ranges ABCIH and EFG shown in FIG. 1, which are obtained by excluding the conventionally used temperature range FGIH from the temperature range ABCDE shown in FIG. 1.

The magnitude of the attachment energy represented by the abscissa depends on the type of metal ions and the component (neutral gas phase molecules). The value of the attachment energy is obtained from a database or by theoretical calculations and can normally be estimated from a known similar substance. The temperature plotted along the right ordinate is the temperature of not a chamber 110 but the ion attachment region 210. This is because the temperature directly concerns the ion attachment region 210 where the attachment energy process actually progresses. The temperature of the ion attachment region can be adjusted in the following way. A temperature measuring means, that is, a thermoscope such as a thermocouple having a small thermal capacity and a low thermal conductivity is directly inserted into the ion attachment region. A table representing the relationship between the heat amount of a heater for heating the ion generation source, the flow rate of a three-body gas that lowers the temperature of the ion attachment region 210, and the temperature of the ion attachment region is prepared in advance. The control unit 300 then controls the heater 130 and the flow rate control unit 310 such as a mass flow controller in accordance with the table. The control unit 300, heater 130, and flow rate control unit 310 form a temperature control means. Note that if only the heater 130 suffices for temperature control of the ion attachment region 210, the temperature control means may include only the heater 130 and the control unit 300.

In this embodiment, the temperature of the ion attachment region 210 is lowered while keeping a high inner wall temperature of the chamber 110. This prevents the decrease in the ionization efficiency (sensitivity) while reducing the influence of adsorption/condensation. The operation uses the fact that that the ionization efficiency (sensitivity) depends on the ion attachment region 210, and condensation/adsorption depends on the inner wall temperature of the chamber 110.

One method of lowering the temperature of the ion attachment region 210 while keeping a high inner wall temperature of the chamber 110 can be implemented by causing the heater 130 directly attached to the chamber 110 to heat its wall part and introducing a three-body gas having a temperature lower than the inner wall temperature of the chamber 110. The simplest is to introduce a three-body gas at room temperature. This allows making the temperature of the ion attachment region 210 lower than the inner wall temperature of the chamber 110. It is also possible to make the temperature of the ion attachment region 210 lower than the inner wall temperature of the chamber 110 by causing the flow rate control unit 310 to control the flow rate of the three-body gas.

That is, even when the heater 130 directly attached to the chamber 110 heats the ion attachment region 210, since a three-body gas at 50 to 100 Pa in the chamber exchanges at a flow rate of, for example, 5 to 10 sccm, the temperature of the ion attachment region 210 can be made lower than the inner wall temperature of the chamber 110 by introducing the three-body gas at room temperature. Note that if the sample is a gas sample, the sample is also preferably introduced at a temperature, for example, room temperature lower than the inner wall temperature of the chamber 110.

To make the temperature of the three-body gas lower than room temperature, the three-body gas is cooled outside the chamber 110 and introduced into it at a temperature lower than room temperature. In this case, the temperature of the ion attachment region 210 becomes lower than that when introducing the three-body gas at room temperature into the chamber 110. Note that if the sample is a gas sample, the sample is also preferably cooled outside and introduced at a temperature lower than room temperature.

In the above-described example, a three-body gas or a three-body gas and a gas sample are cooled to room temperature or less and then introduced into the chamber 110. Only the gas sample may be cooled to room temperature or less and then introduced into the chamber 110.

According to the present invention, it is possible to obtain a synergistic effect of minimum contamination of the chamber 110, small memory effect, suppressed decomposition of measurement target neutral molecules, and high sensitivity. As a result, quick, simple, and accurate mass analysis can be done even for a sample easy to decompose.

The arrangement of a mass spectrometer system of the embodiment will be described below.

First Embodiment

Figure 2:
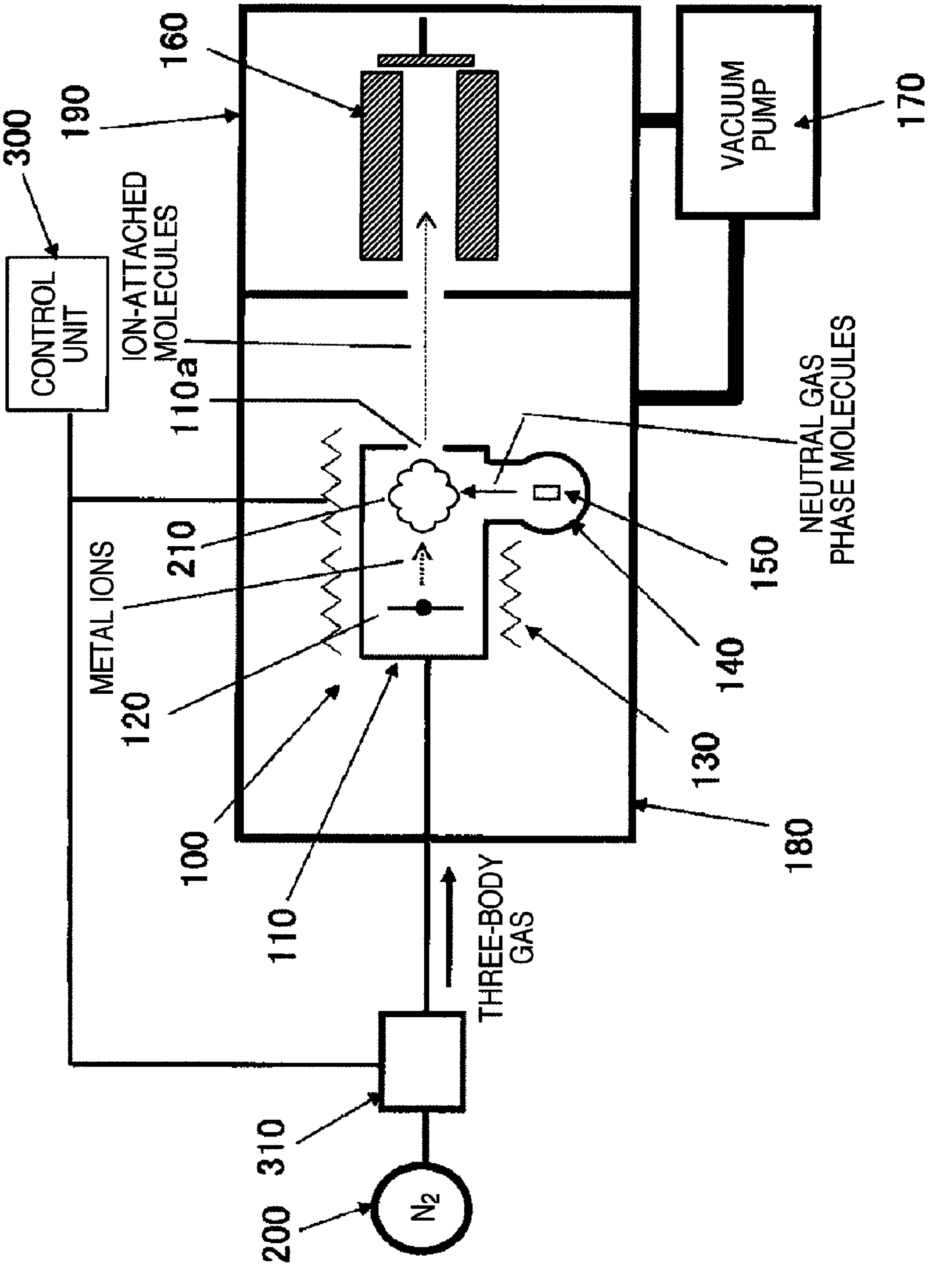
FIG. 2 is a view showing the arrangement of a mass spectrometer system for a solid/liquid sample according to the first embodiment of the present invention.

FIG. 2 is a view showing the arrangement of a mass spectrometer system for a solid/liquid sample according to the first embodiment of the present invention. Note that the same reference numerals as in FIG. 7 denote the same parts in FIG. 2, and a description thereof will not be repeated.

In this embodiment, the temperature of an ion attachment region 210 is set in accordance with the magnitude of an attachment energy decided by metal ions and neutral gas phase molecules. The temperature of a chamber 110 can be obtained by measuring it using a thermocouple (not shown) or the like provided in the ion attachment region 210 or performing conversion using a table representing the relationship between the heat amount of a heater 130 for heating an ion generation source 100, the flow rate of a three-body gas, and the temperature of the ion attachment region.

A control unit 300 adjusts the temperature of the ion attachment region 210 by controlling heating of the chamber 110 and the flow rate of the three-body gas via the heater 130 and a flow rate control unit 310 based on the magnitude of the attachment energy. The three-body gas is introduced at room temperature. The temperature of the ion attachment region 210 is thus made lower than the inner wall temperature of the chamber 110.

With the above-described arrangement, the temperature of the ion attachment region 210 of the ion generation source 100 is set within the range ABCDE shown in FIG. 1.

Second Embodiment

Figure 3:
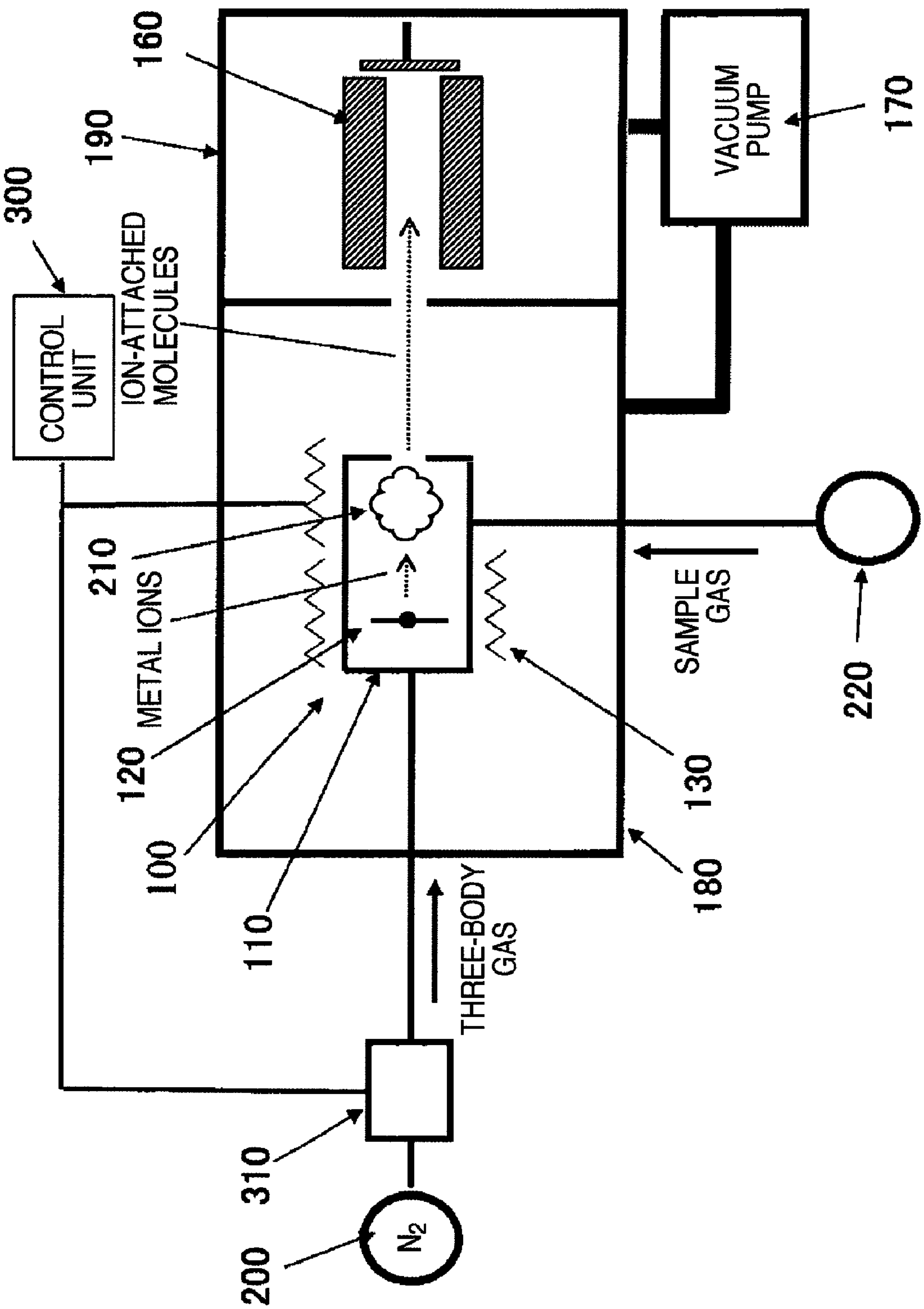
FIG. 3 is a view showing the arrangement of a mass spectrometer system for a gas sample according to the second embodiment of the present invention.

FIG. 3 is a view showing the arrangement of a mass spectrometer system for a gas sample according to the second embodiment of the present invention. Note that the same reference numerals as in FIG. 8 denote the same parts in FIG. 3, and a description thereof will not be repeated.

In this embodiment, a sample vaporization chamber 140 is unnecessary because the sample is gaseous. The gas sample is introduced from a sample gas cylinder 220 into a chamber 110.

The temperature of an ion attachment region 210 can be obtained by measuring it using a thermocouple (not shown) or the like provided in the ion attachment region 210 or creating in advance a table representing the relationship between the heat amount of a heater 130 for heating an ion generation source 100, the flow rate of a three-body gas, and the temperature of the ion attachment region.

A control unit 300 adjusts the temperature of the ion attachment region 210 by controlling heating of the chamber 110 and the flow rate of the three-body gas via the heater 130 and a flow rate control unit 310 based on the magnitude of the attachment energy. The three-body gas is introduced at room temperature. The temperature of the ion attachment region 210 is thus made lower than the inner wall temperature of the chamber 110. With the above-described arrangement, the temperature of the ion attachment region 210 of the ion generation source 100 is set within the range ABODE shown in FIG. 1.

Third Embodiment

Figure 4:
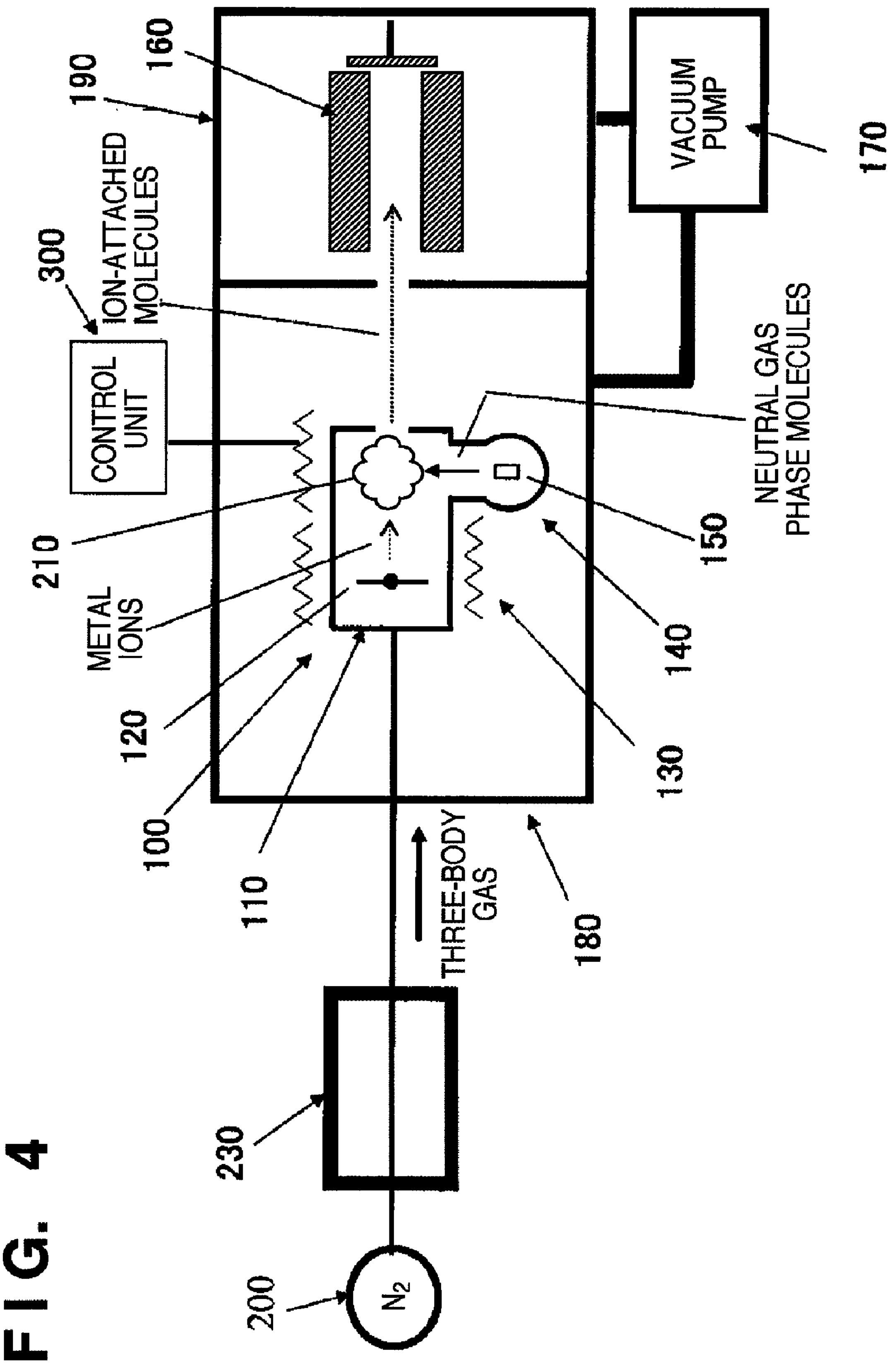
FIG. 4 is a view showing the arrangement of a mass spectrometer system for a solid/liquid sample according to the third embodiment of the present invention.

FIG. 4 is a view showing the arrangement of a mass spectrometer system for a solid/liquid sample according to the third embodiment of the present invention. Note that the same reference numerals as in FIG. 2 denote the same parts in FIG. 4, and a description thereof will not be repeated. In this embodiment, a cooling device 230 is provided in place of a flow rate control unit 310 A three-body gas is cooled by the cooling device 230 to a temperature lower than room temperature and then introduced into a chamber 110. If the temperature of an ion attachment region 210 can be changed only by causing a control unit 300 to control the heating state of a heater 130, the flow rate control unit 310 is unnecessary. Cooling the three-body gas via the cooling device 230 and introducing it at a temperature lower than room temperature make it possible to widen the temperature range of the ion attachment region 210.

Note that when the flow rate control unit 310 is added to control the flow rate of the three-body gas, the controllability (response or convergence) of the temperature of the ion attachment region can further improve, as a matter of course.

Fourth Embodiment

Figure 5:
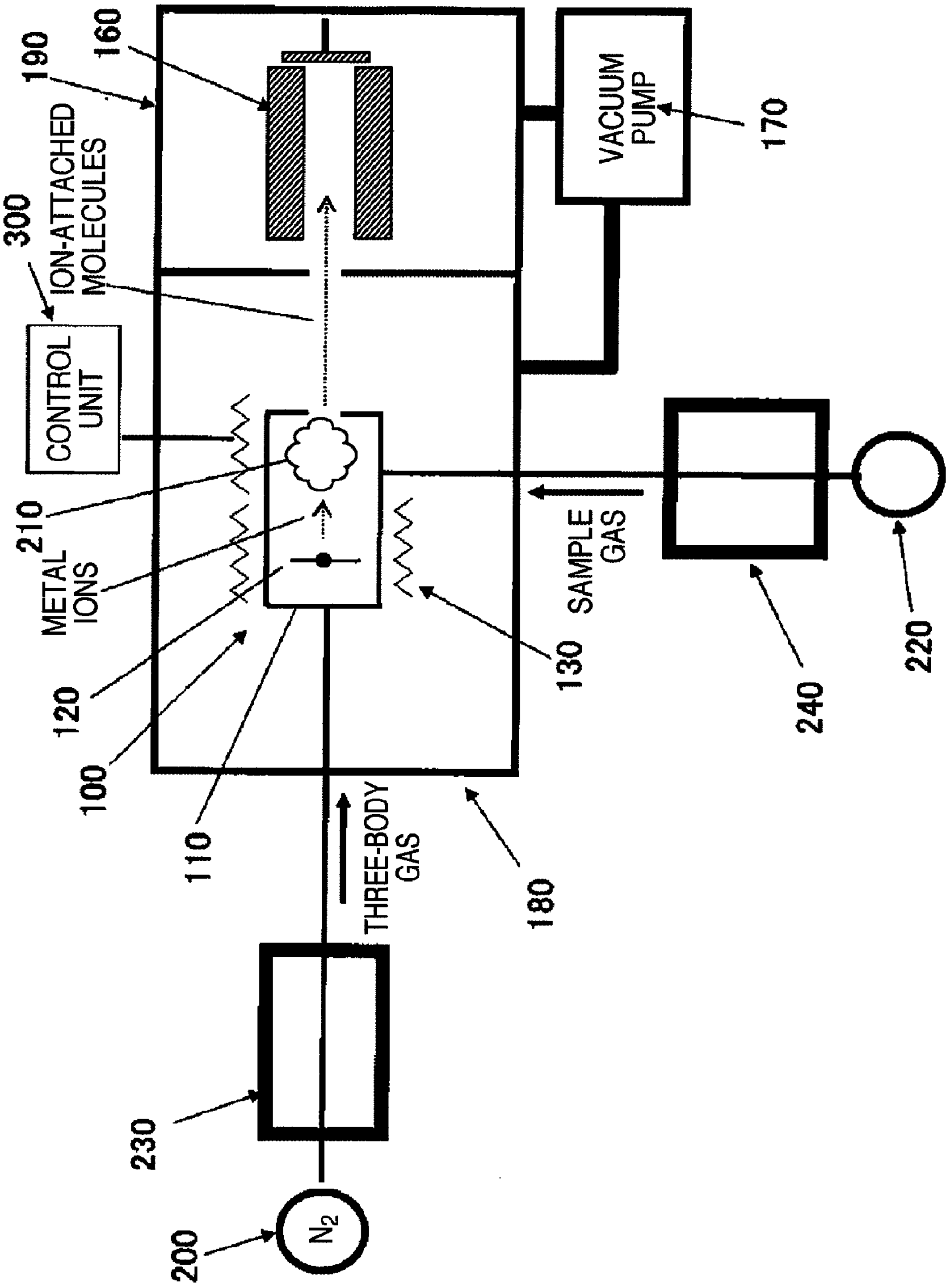
FIG. 5 is a view showing the arrangement of a mass spectrometer system for a gas sample according to the fourth embodiment of the present invention.

FIG. 5 is a view showing the arrangement of a mass spectrometer system for a gas sample according to the fourth embodiment of the present invention. Note that the same reference numerals as in FIG. 3 denote the same parts in FIG. 5, and a description thereof will not be repeated. In this embodiment, a cooling device 230 is provided in place of a flow rate control unit 310. A cooling device 240 for cooling a sample gas is also provided. A three-body gas and a sample gas are cooled by the cooling devices 230 and 240, respectively, to temperatures lower than room temperature and then introduced.

If the temperature of an ion attachment region 210 can be changed only by causing a control unit 300 to control the heating state of a heater 130, the flow rate control unit 230 and 240 is unnecessary. Cooling the three-body gas via the cooling device 230, cooling the sample gas via the cooling device 240, and introducing them at temperatures lower than room temperature make it possible to widen the temperature range of the ion attachment region 210. In this case, the cooling devices 230 and 240 cool the three-body gas and the sample gas, respectively. Instead, one of the three-body gas and the sample gas may be cooled. Note that when the flow rate control unit 310 is added to control the flow rate of the three-body gas, the controllability (response or convergence) of the temperature of the ion attachment region can further improve, as a matter of course.

In the above-described embodiments, no ion species is specified as metal ions. More specifically, $Li^+$ and $Na^+$ as alkali metal ions or $K^+$, $Rb^+$, $Cs^+$, $Al^+$, $Ga^+$, and In are also usable. As a mass analyzer 160, a variety of mass spectrometers such as a quadrupole mass spectrometer (QMS), ion trap (IT) mass spectrometer, magnetic sector (MS) mass spectrometer, time-of-flight (TOF) mass spectrometer, and ion cyclotron resonance (ICR) mass spectrometer are usable.

As the overall structure, a two-chamber structure including a first cell 180 with the ion generation source 100 and a second cell 190 with the mass analyzer 160 has been exemplified. However, the present invention is not limited to this. The pressure outside the ion generation source 100 is 0.01 to 0.1 Pa. A one-chamber structure is possible for a mass analyzer capable of operating at this pressure. For a mass analyzer that requires a much lower pressure, a three- or four-chamber structure is necessary. Generally, it is supposed to be appropriate to use a one-chamber structure for a microminiaturized QMS or IT, a two-chamber structure for a normal QMS or MS, a three-chamber structure for a TOF, and a four-chamber structure for an ICR.

Quick and simple measurement by the ion attachment method is applicable to many substances. Hence, this technique can suitably be used in wide-ranging fields including material developments, product inspections, environmental surveys, and biotechnological researches.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-335095, filed Dec. 26, 2008, Japanese Patent Application No. 2009-285722, filed Dec. 16, 2009, which are hereby incorporated by reference herein in their entirety.

What is claimed is:

1. A mass spectrometer system comprising:

a chamber having an ion emitting unit to emit metal ions in said chamber with a communicating hole; a molecule introduction unit which introduces neutral molecules into the chamber;

a gas introduction unit which introduces another gas into the chamber;

a control unit which controls a temperature of a region where the metal ions attach to the neutral molecules in the chamber; and a mass analyzer which analyzes a mass of the neutral molecules having the metal ions attached and emitted from the communicating hole, wherein said control unit, when plotting an attachment energy of the metal ions attached to the neutral molecules in the chamber along an abscissa and the temperature of the region where the metal ions attach to the neutral molecules along an ordinate, adjusts the temperature of the region so as to make the temperature fall within a range obtained by excluding a range corresponding to the temperature of the region from 150° C. to 200° C. (both inclusive) from a range surrounded by the temperatures of the region [° C.]=150×attachment energy [eV], 100×attachment energy [eV]−50, and 20° C., and attachment energies [eV]=2.1 and 0.5.

2. The mass spectrometer system according to claim 1, wherein said control unit adjusts the temperature of the region so as to make the temperature fall within at least one of a range surrounded by the temperatures of the region [° C.]=150× attachment energy [eV] and 200° C. and the attachment energy [eV]=2.1 and a range surrounded by the temperatures of the region [° C.]=150×attachment energy [eV], 150° C., 100×attachment energy [eV]−50, and 20° C., and the attachment energy [eV]=0.5.

3. The mass spectrometer system according to claim 1, wherein said control unit makes the temperature of the region lower than a temperature of a wall portion of the chamber.

4. The mass spectrometer system according to claim 1, wherein said a molecule introduction unit introduces neutral gas phase molecules into the chamber by heating and vaporizing a solid/liquid sample.

5. The mass spectrometer system according to claim 1, further comprising a heater which heats the chamber, wherein said control unit controls to raise the temperature of the region by heating said heater and lower the temperature of the region by increasing an introduced amount of the other gas to the chamber.

6. The mass spectrometer system according to claim 1, further comprising a cooling device which cools the other gas.

7. The mass spectrometer system according to claim 1, further comprising a cooling device which cools the neutral molecules.

8. A mass spectrometry method in a mass spectrometer system that comprises a chamber having an ion emitting unit to emit metal ions in said chamber with a communicating hole; a molecule introduction unit which introduces neutral molecules into the chamber; a gas introduction unit which introduces another gas into the chamber; and a mass analyzer which analyzes a mass of the neutral molecules having the metal ions attached and emitted from the communicating hole, the method comprising the step of controlling a temperature of a region where the metal ions attach to the neutral molecules in the chamber, wherein in the controlling step, plotting an attachment energy of the metal ions attached to the neutral molecules in the chamber along an abscissa and the temperature of the region where the metal ions attach to the neutral molecules along an ordinate, the temperature of the region is adjusted so as to make the temperature fall within a range obtained by excluding a range corresponding to the temperature of the region from 150° C. to 200° C. (both inclusive) from a range surrounded by the temperatures of the region [° C.]=150×attachment energy [eV], 100×attachment energy [eV]−50, and 20° C., and attachment energies [eV]=2.1 and 0.5.

* * * * *